United States Patent
Suryanarayana et al.

(10) Patent No.: US 10,706,152 B2
(45) Date of Patent: Jul. 7, 2020

(54) SYSTEMS AND METHODS FOR CONCEALED OBJECT STORE IN A VIRTUALIZED INFORMATION HANDLING SYSTEM

(71) Applicant: Dell Products L.P., Round Rock, TX (US)

(72) Inventors: Shekar Babu Suryanarayana, Bangalore (IN); Yogesh P. Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 66 days.

(21) Appl. No.: 15/784,409

(22) Filed: Oct. 16, 2017

(65) Prior Publication Data
US 2019/0114427 A1 Apr. 18, 2019

(51) Int. Cl.
*G06F 9/455* (2018.01)
*G06F 21/57* (2013.01)
*G06F 21/53* (2013.01)

(52) U.S. Cl.
CPC .......... *G06F 21/57* (2013.01); *G06F 9/45558* (2013.01); *G06F 21/53* (2013.01); *G06F 21/575* (2013.01); *G06F 2009/45583* (2013.01); *G06F 2009/45587* (2013.01)

(58) Field of Classification Search
CPC ...................................................... G06F 21/57
USPC .......................................................... 718/1
See application file for complete search history.

(56) References Cited

U.S. PATENT DOCUMENTS

| | | | | |
|---|---|---|---|---|
| 7,962,738 | B2* | 6/2011 | Zimmer | G06F 21/51 713/2 |
| 2008/0047015 | A1* | 2/2008 | Cornwall | G06F 21/51 726/25 |
| 2014/0215277 | A1* | 7/2014 | Judd | G06F 11/2284 714/42 |
| 2018/0004559 | A1* | 1/2018 | Geml | G06F 9/45558 |

OTHER PUBLICATIONS

Dan Ports et al., "Towards Application Security on Untrusted Operating Systems", 2008, pp. 1-7 (Year: 2008).*

* cited by examiner

*Primary Examiner* — Wei Y Zhen
*Assistant Examiner* — Lanny N Ung
(74) *Attorney, Agent, or Firm* — Jackson Walker L.L.P.

(57) ABSTRACT

In accordance with embodiments of the present disclosure, an information handling system may include a processor subsystem configured to execute a hypervisor, wherein the hypervisor is configured to host a plurality of virtual machines and a memory subsystem communicatively coupled to the processor subsystem. The memory subsystem may be configured to implement namespaces for the hypervisor and the plurality of virtual machines and implement for each of the namespaces a concealed namespace object store as a hidden metadata area of the memory subsystem unexposed to the hypervisor and the plurality of virtual machines, each concealed namespace object store comprising metadata for an associated namespace.

15 Claims, 3 Drawing Sheets

SYSTEMS AND METHODS FOR CONCEALED OBJECT STORE IN A VIRTUALIZED INFORMATION HANDLING SYSTEM

TECHNICAL FIELD

This disclosure relates generally to virtualized information handling systems and more particularly to data security in an information handling system comprising a plurality of virtualized information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

Often, virtualized architectures may be employed for numerous reasons, such as, but not limited to: (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and (5) encapsulation of complex configurations into a file that is easily replicated and provisioned, among other reasons. As noted above, the information handling system may include one or more operating systems, for example, executing as guest operating systems in respective virtual machines.

An operating system serves many functions, such as controlling access to hardware resources and controlling the execution of application software. Operating systems also provide resources and services to support application software. These resources and services may include data storage, support for at least one file system, a centralized configuration database (such as the registry found in Microsoft Windows operating systems), a directory service, a graphical user interface, a networking stack, device drivers, device management software, and memory. In some instances, services may be provided by other application software running on the information handling system, such as a database server.

One of the main disadvantages of a virtualized computing environment is that tools and practices for securing a physical information handling system infrastructure do not necessarily extend well to a virtual environment. A hypervisor of a host operating system upon which a virtual machine executed may have many vulnerabilities. Due to native virtualization architecture which may require specially configured hardware, most virtualization deployments are implemented with the hosted architecture. With vulnerabilities and security holes in most modern operating systems, malicious attacks can be carried out to gain control of the host operating system. Because the hypervisor is often a layer executing on the host operating system, once an attacker has control of a host operating system, the hypervisor is essentially compromised. Thus, an attacker may corrupt critical portions of virtual machines, including a virtual machine boot on memory namespaces (including, for example, persistent memory namespace such as non-volatile dual-inline memory module (NV-DIMM) namespaces) and can perform one or more malicious activities on any of the virtual machines hosted by the hypervisor.

Attacks on a hypervisor through a guest operating system may use the guest operating system to gain unauthorized access to other virtual namespaces on a memory module (e.g., NV-DIMM). Because many virtual machines may share the same physical resources (e.g., NV-DIMM namespaces), if an attacker is able to discover how one virtual machine's virtual resources map to physical resources, the attacker may be able to conduct attacks directly on the real physical resources. By modifying his virtual memory in a way that exploits how the physical resources are mapped to each virtual machine, the attacker may adversely affect multiple virtual machines and the hypervisor, and potentially all virtual machine and operating systems boots may fail.

Any small namespace attribute change may cause block input/output (I/O) issues in a namespace, and as a result, an entire virtual machine may fail to load/boot. A virtual machine has access only to read/write to namespace data areas but namespace attributes or metadata is often not accessible to a virtual machine because of security reasons. But the vulnerabilities of a hypervisor may allow an attacker to gain access to virtual machines to corrupt the namespace object data. Because NV-DIMM namespace labels and metadata objects are created within NV-DIMM storage space and maintained at the hypervisor level, such namespace labels and metadata objects are prone to corruption.

SUMMARY

In accordance with the teachings of the present disclosure, the disadvantages and problems associated with data security in a virtualized information handling system architecture may be reduced or eliminated.

In accordance with embodiments of the present disclosure, an information handling system may include a processor subsystem configured to execute a hypervisor, wherein the hypervisor is configured to host a plurality of virtual machines and a memory subsystem communicatively coupled to the processor subsystem. The memory subsystem may be configured to implement namespaces for the hypervisor and the plurality of virtual machines and implement for each of the namespaces a concealed namespace object store as a hidden metadata area of the memory subsystem unexposed to the hypervisor and the plurality of virtual machines, each concealed namespace object store comprising metadata for an associated namespace.

In accordance with these and other embodiments of the present disclosure, a method may include, in an information handling system comprising a processor subsystem configured to execute a hypervisor, wherein the hypervisor is configured to host a plurality of virtual machines and comprising a memory subsystem communicatively coupled to the processor subsystem, implementing, within the memory subsystem, namespaces for the hypervisor and the plurality of virtual machines. The method may also include implementing, within the memory subsystem, for each of the namespaces a concealed namespace object store as a hidden metadata area of the memory subsystem unexposed to the hypervisor and the plurality of virtual machines, each concealed namespace object store comprising metadata for an associated namespace.

In accordance with these and other embodiments of the present disclosure, an article of manufacture may include a non-transitory computer-readable medium and computer-executable instructions for a proxy server carried on the computer-readable medium, the instructions readable by a processor, the instructions, when read and executed, for causing the processor to, in an information handling system comprising a processor subsystem configured to execute a hypervisor, wherein the hypervisor is configured to host a plurality of virtual machines and comprising a memory subsystem communicatively coupled to the processor subsystem: implement, within the memory subsystem, namespaces for the hypervisor and the plurality of virtual machines; and implement, within the memory subsystem, for each of the namespaces a concealed namespace object store as a hidden metadata area of the memory subsystem unexposed to the hypervisor and the plurality of virtual machines, each concealed namespace object store comprising metadata for an associated namespace.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
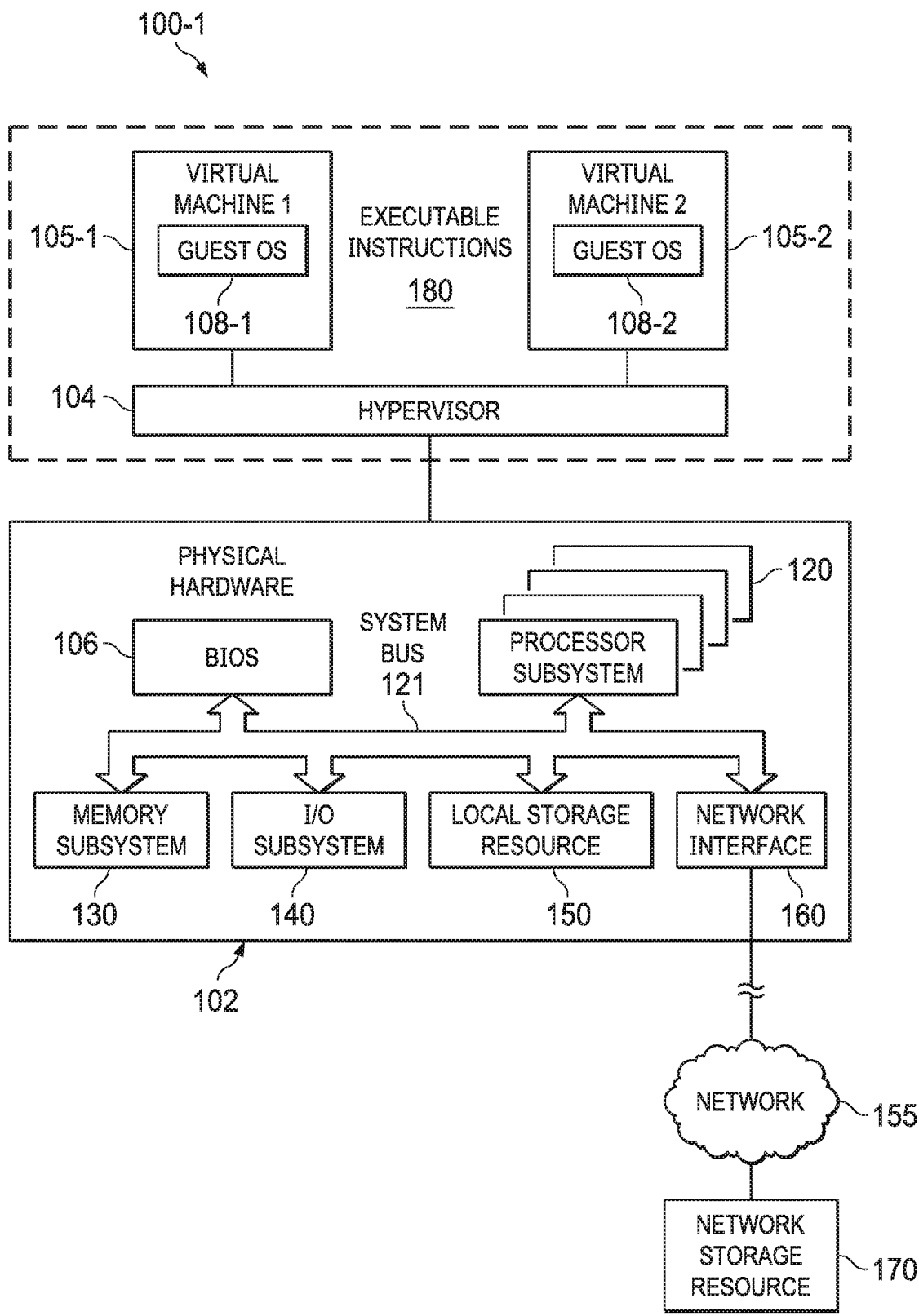
FIG. 1 illustrates a block diagram of selected elements of an example information handling system, in accordance with embodiments of the present disclosure.
Figure 2:
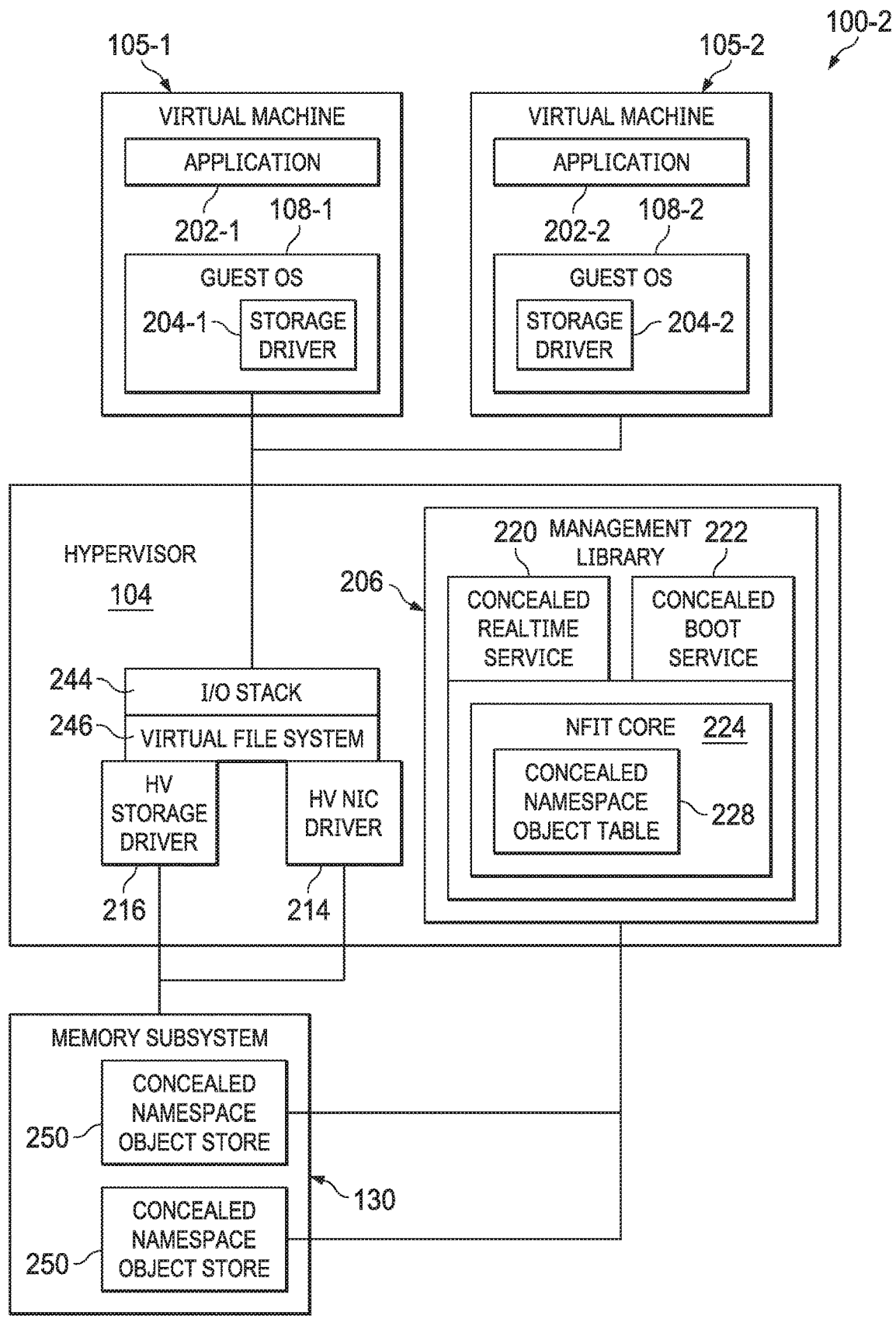
FIG. 2 illustrates a block diagram of selected elements of another example information handling system, in accordance with embodiments of the present disclosure.
Figure 3:
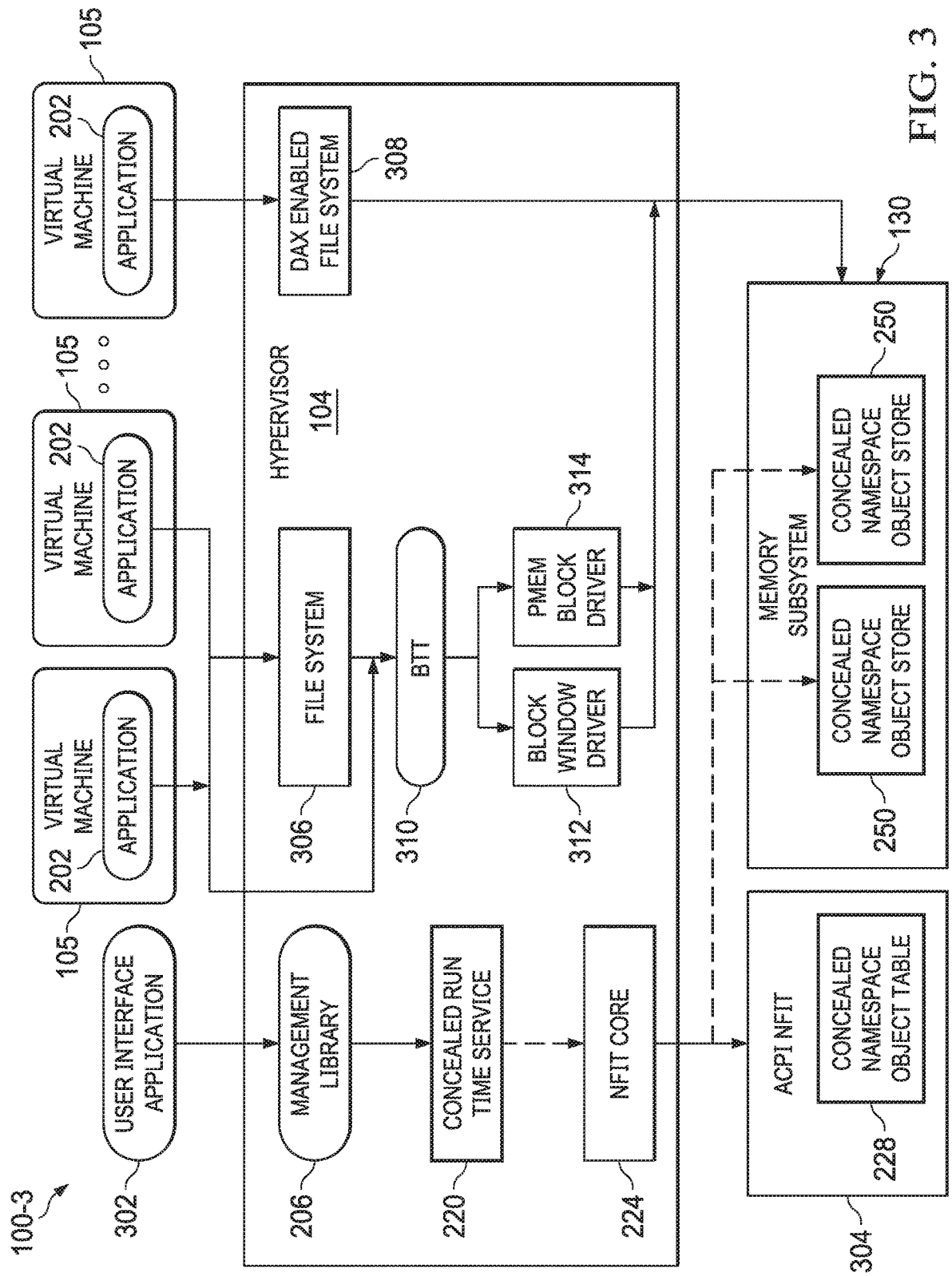
FIG. 3 illustrates a block diagram of selected elements of yet another example information handling system, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, device "12-1" refers to an instance of a device class, which may be referred to collectively as devices "12" and any one of which may be referred to generically as a device "12".

Referring now to the drawings, FIG. 1 illustrates a block diagram of selected elements of an example information handling system 100-1, in accordance with embodiments of the present disclosure. As depicted in FIG. 1, system 100-1 may represent an information handling system comprising physical hardware 102 and executable instructions 180 (including hypervisor 104 and one or more virtual machines 105). System 100-1 may also include external or remote elements, for example, network 155 and network storage resource 170.

As shown in FIG. 1, components of physical hardware 102 may include, but are not limited to, processor subsystem 120, which may comprise one or more processors, and system bus 121 that may communicatively couple various system components to processor subsystem 120 including, for example, a BIOS 106, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCIe bus, HyperTransport (HT) bus, and Video Electronics Standards Association (VESA) local bus.

Network interface 160 may comprise any suitable system, apparatus, or device operable to serve as an interface between information handling system 100-1 and network 155. Network interface 160 may enable information handling system 100-1 to communicate over network 155 using a suitable transmission protocol or standard, including, but not limited to, transmission protocols or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, firmware, or any combination thereof.

As depicted in FIG. 1, processor subsystem 120 may comprise any suitable system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and execute program instructions or process data stored locally (e.g., in BIOS 106, memory subsystem 130, or another component of physical hardware 102). In the same or alternative embodiments, processor subsystem 120 may interpret and execute program instructions or process data stored remotely (e.g., in network storage resource 170). In particular, processor subsystem 120 may represent a multi-processor configuration that includes at least a first processor and a second processor (see also FIG. 2).

BIOS 106 may include any system, device, or apparatus configured to identify, test, and/or initialize information handling resources of information handling system 100-1, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 106 may be implemented as a program of instructions that may be read by and executed on processor subsystem 120 to carry out the functionality of BIOS 106. In these and other embodiments, BIOS 106 may comprise boot firmware configured to be the first code executed by processor subsystem 120 when information handling system 100-1 is booted and/or powered on. As part of its initialization functionality, code for BIOS 106 may be configured to set components of information handling system 100-1 into a known state, so that one or more applications (e.g., an operating system or other application programs) stored on compatible media (e.g., disk drives) may be executed by processor subsystem 120 and given control of information handling system 100-1.

Memory subsystem 130 may comprise any suitable system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, or a suitable selection or array of volatile or non-volatile memory that retains data after power to an associated information handling system, such as system 100-1, is powered down. In some embodiments, some or all of memory subsystem 130 may comprise persistent memory, such as one or more Non-Volatile Dual-Inline Memory Modules (NV-DIMMs) configured to maintain persistence of data written to the persistent memory in the event of a power event in which electrical energy to the persistent memory is withdrawn.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and data. Likewise, network storage resource 170 may comprise computer-readable media (e.g., hard disk drive, floppy disk drive, CD-ROM, or other type of rotating storage media, flash memory, EEPROM, or other type of solid state storage media) and may be generally operable to store instructions and data. In system 100-1, I/O subsystem 140 may comprise any suitable system, device, or apparatus generally operable to receive and transmit data to or from or within system 100-1. I/O subsystem 140 may represent, for example, any one or more of a variety of communication interfaces, graphics interfaces, video interfaces, user input interfaces, and peripheral interfaces.

Hypervisor 104 may comprise software (i.e., executable code or instructions) and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In embodiments represented by FIG. 1, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and as firmware running on physical hardware 102), also referred to as device pass-through. By using device pass-through, the virtual machine may utilize a physical device directly without the intermediate use of operating system drivers. As a further alternative, the virtualization application of hypervisor 104 may, on various levels, interact directly with physical hardware 102 (e.g., similar to the way the OS interacts directly with physical hardware 102, and as firmware running on physical hardware 102) without utilizing the OS, although still interacting with the OS to coordinate use of physical hardware 102.

As shown in FIG. 1, virtual machine 1 105-1 may represent a host for guest OS 108-1, while virtual machine 2 105-2 may represent a host for guest OS 108-2. To allow multiple operating systems to be executed on system 100-1 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. In some embodiments, the virtualized hardware representation presented to each of virtual machines 105 may comprise a mutually exclusive (i.e., disjointed or non-overlapping) set of hardware resources per virtual machine 105 (e.g., no hardware resources are shared between virtual machines 105). In other embodiments, the virtualized hardware representation may comprise an overlapping set of hardware resources per virtual machine 105 (e.g., one or more hardware resources are shared by two or more virtual machines 105).

In some embodiments, hypervisor 104 may assign hardware resources of physical hardware 102 statically, such that certain hardware resources are assigned to certain virtual machines, and this assignment does not vary over time. Additionally or alternatively, hypervisor 104 may assign hardware resources of physical hardware 102 dynamically, such that the assignment of hardware resources to virtual machines varies over time, for example, in accordance with the specific needs of the applications running on the individual virtual machines. Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, each of virtual machines 105 may respectively include an instance of a guest operating system (guest OS) 108, along with any applications or other software running on guest OS 108. Each guest OS 108 may represent an OS compatible with and supported by hypervisor 104, even when guest OS 108 is incompatible to a certain extent with physical hardware 102, which is virtualized by hypervisor 104. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-2 may comprise a MICROSOFT WINDOWS OS, and another guest OS on another virtual machine (not shown) may comprise a VXWORKS OS. Although system 100-1 is depicted as having two virtual machines 105-1 and 105-2, it will be understood that, in particular embodiments, different numbers of virtual machines 105 may be executing on system 100-1 at any given time.

In operation of system 100-1 shown in FIG. 1, hypervisor 104 of information handling system 100-1 may virtualize the hardware resources of physical hardware 102 and present virtualized computer hardware representations to each of virtual machines 105. Each guest OS 108 of virtual machines 105 may then begin to operate and run applications and/or other software. While operating, each guest OS 108 may utilize one or more hardware resources of physical hardware 102 assigned to the respective virtual machine by hypervisor 104.

FIG. 2 illustrates a block diagram of selected elements of an example information handling system 100-2, in accordance with embodiments of the present disclosure. In FIG. 2, system 100-2 may represent an information handling system that is an embodiment of system 100-1 (see FIG. 1). As shown, system 100-2 may include further details regarding the operation and use of components for implementing increased data security, while other elements shown in system 100-1 have been omitted from FIG. 2 for descriptive clarity.

As shown in FIG. 2, each virtual machine 105 (e.g., virtual machines 105-1 and 105-2) may execute an application 202 and a guest OS 108 under which a storage driver 204 may be installed and loaded. A storage driver 204 may enable a virtual machine 105 to access storage resources via I/O stack 244, virtual file system 246, hypervisor (HV) storage driver 216, and/or HV network integrated controller (NIC) driver 214, which may be loaded into hypervisor 104. I/O stack 244 may provide interfaces to VM-facing I/O by hypervisor 104 to interact with a storage driver 204 executing on a virtual machine 105. Virtual file system 246 may comprise a file system provided by hypervisor 104, for example, for access by a guest OS 108. As shown in FIG. 2, virtual file system 246 may interact with HV storage driver 216 and HV NIC driver 214, to access physical hardware including memory subsystem 130.

Additionally, a management library 206 as shown in FIG. 2 may execute within hypervisor 104 or in conjunction therewith to execute concealed services which may create and manage one or more concealed namespace object stores (e.g., concealed namespace object stores 250) to provide data security within system 100-2.

A concealed namespace object store 250 may be created for each namespace in memory subsystem 130. In some embodiments, memory subsystem 130 may comprise a persistent memory subsystem including one or more NV-DIMMs. Each concealed namespace object store 250 may, for its associated namespace, store metadata related to the associated namespace including, without limitation, enumeration information for the associated namespace, memory offset location for the associated namespace, and/or other attributes of the associated namespace. Each concealed object store 250 may be created by NVDIMM Firmware Interface Table (NFIT) core 224 executing within management library 206, wherein NFIT table core 224 may maintain a concealed namespace object table 226 defining attributes for the various concealed namespace object stores 250.

In operation, each concealed namespace object store 250 may comprise a hidden data area which is unexposed to a host OS of hypervisor 104 and guest OSes 108 of virtual machines 105. Instead, management library 206 may have access to read concealed namespace object table 226 and does not report address ranges of the concealed namespace object stores 250 to the host OS of the hypervisor 104 or the guest OSes 108 of virtual machines 105.

Privileges to concealed namespace object stores 250 may be controlled by concealed real-time service 220 in order to provide secure access to concealed namespace object stores 250. A concealed namespace object store 250 may comprise a pre-boot device handler which may be exposed at runtime to a host OS of hypervisor 104 or a guest OS 108 of a virtual machine 105 via concealed real-time service 220. Concealed real-time service 220 may comprise a special runtime service of management library 206 that enables privilege to a concealed namespace object store 250 by an authorized host OS or guest OS 108 by securely validating a signature of a host OS or guest OS 108. Such signatures may be stored within a store of management library 206 and used for secure validation. After securely validating a signature of a host OS or guest OS 108, concealed real-time service 220 may, during a secure session, open a port of NFIT core 224 to allow access by the validated host OS or guest OS 108 to the concealed namespace object store 250, thus providing such host OS or guest OS 108 the metadata required to interact with namespaces for which the OS is authorized to interact. To ensure security, the secure session may be short lived, thus requiring frequent validation in order to keep the NFIT core port open.

As shown in FIG. 2, management library 206 may also include concealed boot service 222. Concealed boot service 222 may be implemented as part of a BIOS boost service table (e.g., EFI boot service table) in order to obtain secure boot handlers to facilitate secure boot for images stored within a concealed namespace object store 250.

FIG. 3 illustrates a block diagram of selected elements of an example information handling system 100-3, in accordance with embodiments of the present disclosure. In FIG. 3, system 100-3 may represent an information handling system that is an embodiment of system 100-1 (see FIG. 1) and/or system 100-2 (see FIG. 2). As shown, system 100-3 may include further details regarding the operation and use of components for implementing increased data security, while other elements shown in system 100-1 and system 100-2 have been omitted from FIG. 3 for descriptive clarity.

As shown in FIG. 3, each virtual machine 105 may execute an application 202. An application 202 may access storage resources via a file system 306, direct access (DAX) enabled file system 308, block translation table (BTT) 310, block window driver 312, and persistent memory (PMEM) block driver 314, which may execute within hypervisor 104. Functionality of such components are known in the art.

Additionally, a management library 206 as shown in FIG. 3 may execute within hypervisor 104 or in conjunction therewith to execute concealed real time service 220 which may in turn execute NFIT core 224 to create and manage one or more concealed namespace object stores (e.g., concealed namespace object stores 250) to provide data security within system 100-3.

As shown in FIG. 3, NFIT core 224 may interface with an Advanced Configuration and Power Interface (ACPI) NFIT 304 in which concealed namespace object table 228 may be implemented.

Among the advantages of the approach described above is that it allows for efficient management of namespace metadata, and allows virtual machine namespace data to be kept safe and secure even if a hypervisor experiences vulnerabilities. Also, access of a concealed object data store using a concealed real time service may overcome problems with existing approaches wherein corruption to namespace metadata adversely affects VM boot.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
    a processor subsystem configured to execute a hypervisor, wherein the hypervisor is configured to host a plurality of virtual machines; and
    a memory subsystem communicatively coupled to the processor subsystem, the memory subsystem configured to:
        implement namespaces for the hypervisor and the plurality of virtual machines; and
        implement for each of the namespaces a concealed namespace object store as a hidden metadata area of the memory subsystem unexposed to the hypervisor and the plurality of virtual machines, each concealed namespace object store comprising metadata for an associated namespace;
        wherein, for each namespace, the concealed namespace object store is inaccessible to the hypervisor, but a remainder of the namespace is accessible to the hypervisor.

2. The information handling system of claim 1, wherein the processor subsystem is further configured to execute a concealed real time service executing on the hypervisor, wherein the concealed real time service is configured to control access to each concealed namespace object store by validating access of the hypervisor and the plurality of virtual machines to the concealed namespace object stores.

3. The information handling system of claim 2, wherein the concealed real time service is configured to validate access of one of the hypervisor and the plurality of virtual machines by validating a signature of the one of the hypervisor and the plurality of virtual machines.

4. The information handling system of claim 2, wherein each concealed namespace object store is defined by a concealed namespace object table maintained by the hypervisor.

5. The information handling system of claim 4, wherein the memory subsystem comprises a persistent memory comprising one or more non-volatile dual-inline memory modules, and wherein the concealed namespace object table is maintained within a non-volatile dual-inline memory firmware interface table.

6. A method comprising, in an information handling system comprising a processor subsystem configured to execute a hypervisor, wherein the hypervisor is configured to host a plurality of virtual machines and comprising a memory subsystem communicatively coupled to the processor subsystem:
    implementing, within the memory subsystem, namespaces for the hypervisor and the plurality of virtual machines; and
    implementing, within the memory subsystem, for each of the namespaces a concealed namespace object store as a hidden metadata area of the memory subsystem unexposed to the hypervisor and the plurality of virtual machines, each concealed namespace object store comprising metadata for an associated namespace;
    wherein, for each namespace, the concealed namespace object store is inaccessible to the hypervisor, but a remainder of the namespace is accessible to the hypervisor.

7. The method of claim 6, further comprising executing, by the processor subsystem, a concealed real time service executing on the hypervisor, wherein the concealed real time service is configured to control access to each concealed namespace object store by validating access of the hypervisor and the plurality of virtual machines to the concealed namespace object stores.

8. The method of claim 7, wherein the concealed real time service is configured to validate access of one of the hypervisor and the plurality of virtual machines by validating a signature of the one of the hypervisor and the plurality of virtual machines.

9. The method of claim 7, wherein each concealed namespace object store is defined by a concealed namespace object table maintained by the hypervisor.

10. The method of claim 9, wherein the memory subsystem comprises a persistent memory comprising one or more non-volatile dual-inline memory modules, and wherein the concealed namespace object table is maintained within a non-volatile dual-inline memory firmware interface table.

11. An article of manufacture comprising:
    a non-transitory computer-readable medium; and
    computer-executable instructions carried on the computer-readable medium, the instructions readable by a processor, the instructions, when read and executed, for causing the processor to, in an information handling system comprising a processor subsystem configured to execute a hypervisor, wherein the hypervisor is configured to host a plurality of virtual machines and comprising a memory subsystem communicatively coupled to the processor subsystem:
        implement, within the memory subsystem, namespaces for the hypervisor and the plurality of virtual machines; and
        implement, within the memory subsystem, for each of the namespaces a concealed namespace object store as a hidden metadata area of the memory subsystem unexposed to the hypervisor and the plurality of virtual machines, each concealed namespace object store comprising metadata for an associated namespace;

wherein, for each namespace, the concealed namespace object store is inaccessible to the hypervisor, but a remainder of the namespace is accessible to the hypervisor.

12. The article of claim 11, the instructions further configured to execute, within the processor subsystem, a concealed real time service executing on the hypervisor, wherein the concealed real time service is configured to control access to each concealed namespace object store by validating access of the hypervisor and the plurality of virtual machines to the concealed namespace object stores.

13. The article of claim 12, wherein the concealed real time service is configured to validate access of one of the hypervisor and the plurality of virtual machines by validating a signature of the one of the hypervisor and the plurality of virtual machines.

14. The article of claim 12, wherein each concealed namespace object store is defined by a concealed namespace object table maintained by the hypervisor.

15. The article of claim 14, wherein the memory subsystem comprises a persistent memory comprising one or more non-volatile dual-inline memory modules, and wherein the concealed namespace object table is maintained within a non-volatile dual-inline memory firmware interface table.

\* \* \* \* \*